United States Patent
Gunjan

(10) Patent No.: US 9,465,831 B2
(45) Date of Patent: Oct. 11, 2016

(54) SYSTEM AND METHOD FOR OPTIMIZING STORAGE OF MULTI-DIMENSIONAL DATA IN DATA STORAGE

(71) Applicant: Wipro Limited, Bangalore (IN)

(72) Inventor: Abhishek Gunjan, Nutan Nagar Gaya (IN)

(73) Assignee: Wipro Limited, Bangalore (IN)

( * ) Notice: Subject to any disclaimer, the term of this patent is extended or adjusted under 35 U.S.C. 154(b) by 293 days.

(21) Appl. No.: 14/477,504

(22) Filed: Sep. 4, 2014

(65) Prior Publication Data

US 2016/0019249 A1    Jan. 21, 2016

(30) Foreign Application Priority Data

Jul. 18, 2014  (IN) .......................... 3543/CHE/2014

(51) Int. Cl.
G06F 17/30    (2006.01)

(52) U.S. Cl.
CPC ... G06F 17/30333 (2013.01); G06F 17/30194 (2013.01); G06F 17/30339 (2013.01); G06F 17/30592 (2013.01)

(58) Field of Classification Search
CPC .................. G06F 17/30339; G06F 17/30333; G06F 17/30592
See application file for complete search history.

(56) References Cited

U.S. PATENT DOCUMENTS

| | | | | |
|---|---|---|---|---|
| 6,931,418 B1* | 8/2005 | Barnes | ............. | G06F 17/30333 707/600 |
| 7,562,076 B2* | 7/2009 | Kapur | ............... | G06F 17/30867 |
| 8,321,373 B2* | 11/2012 | Bakalash | .......... | G06F 17/30457 707/600 |
| 2003/0229652 A1* | 12/2003 | Bakalash | .......... | G06F 17/30457 |
| 2013/0103764 A1* | 4/2013 | Verkasalo | ......... | G06F 17/30241 709/204 |
| 2015/0073934 A1* | 3/2015 | Tuzhilin | ............ | G06F 17/30412 705/26.7 |

* cited by examiner

*Primary Examiner* — Leslie Wong
(74) *Attorney, Agent, or Firm* — LeClairRyan, a Professional Corporation

(57) ABSTRACT

This technology relates to method and optimization systems for optimizing storage of multi-dimensional data in data storage. The method comprises analyzing a plurality of queries received over period of time from one or more client machines. Then, a query pattern is determined from plurality of queries. Based on query pattern dimensionality of data is identified for determining data storage strategy. The dimensionality is characterized into 11 dimensions comprising 4 standard level dimensions and 7 higher level dimensions. A highest dimension out of 7 higher dimensions is parallel data storage dimension. Based on storage strategy, at least one of data and columns of a table is segmented in data storage. Next, data is stored in remote data storage when data is an element of last higher level dimension. Then, higher level dimensions are fragmented into one or more smaller level dimensions when data is element greater than 11 dimensions.

18 Claims, 4 Drawing Sheets

SYSTEM AND METHOD FOR OPTIMIZING STORAGE OF MULTI-DIMENSIONAL DATA IN DATA STORAGE

This application claims the benefit of Indian Patent Application No. 3543/CHE/2014 filed Jul. 18, 2014, which is hereby incorporated by reference in its entirety.

TECHNICAL FIELD

The present subject matter is related, in general to multidimensional data storage and more particularly, but not exclusively to a method and an optimization system for optimizing storage of multidimensional data in data storage.

BACKGROUND

Generally, a data storage or data warehouse is computer based database utilized to store records and results pertaining to queries. The records correspond with entities, such as individuals, organizations and property etc. Each record contains identifiers of the entity, for example, name, address or account information respectively is the identifier for the entity named individual. The data storage stores results and records in rows and columns wise. Usually, one or more queries are raised from client machines for retrieving results and records for the one or more queries from the data storage. In the existing methods, different types of normalizations are carried out to organize the contents of the tables for databases and data warehouses. Sometimes, the one or more queries are of same pattern for which results and records are also of same pattern. Typically, normalization is carried out for each of the one or more queries separately. In such case, the method of normalization consumes time and bandwidth to retrieve results towards the same kinds of queries.

Also, the existing data storage is restricted to 5 normal forms. Further, the existing data storage does not perform storing of data in a way matching the human thought process. In such case, representation of data is static in nature and the nature of storage needs to be predefined at the time of creation of storage. Hence, the storage cannot be changed dynamically based on change in user demand and access pattern.

In order to overcome the problem of normalization and growing dimensions in data, a fast indexing mechanism, for e.g. Hash or factorization mechanism for e.g. Map-Reduce is implemented. However, the indexing mechanism is another way of storing the data which does not provide results based on data demand and usage pattern of different users.

Hence, there is a need for a method to cater with fast access mechanism for the same kinds of the queries and to handle increasing dimensionality of data in the data storage.

SUMMARY

One or more shortcomings of the prior art are overcome and additional advantages are provided through the present disclosure. Additional features and advantages are realized through the techniques described and illustrated in the present disclosure. Other embodiments and aspects of the technology are described in detail herein and are considered a part of the claimed disclosure.

Disclosed herein is a method for optimizing storage of multi-dimensional data in data storage. The method comprises analyzing, by an optimization system, a plurality of queries received over a period of time from one or more client machines. From the plurality of queries the optimization system determines a query pattern. Then, dimensionality of data is identified by the optimization system based on the query pattern for determining data storage strategy. The dimensionality is characterized into 11 dimensions comprising 4 standard level dimensions and 7 higher level dimensions. Next, based on the determined storage strategy the optimization system performs at least one of segmenting at least one of the data and columns of a table stored in the data storage based on the identified dimensionality of data. Based on the determined storage strategy the optimization system performs storing the data in remote data storage when the data is an element of a last higher level dimension. The optimization system performs fragmenting the higher level dimensions into one or more smaller level dimensions when the data is an element greater than the 11 dimensions. The steps of at least one of the analyzing, the determining, the identifying, and performing is performed by a processor of the optimization system.

In an aspect of this technology, an optimization system for optimizing storage of multi-dimensional data in data storage is disclosed. The optimization system comprises a processor and a memory communicatively coupled to the processor. The memory stores processor-executable instructions, which, on execution, cause the processor to analyze a plurality of queries received over a period of time from one or more client machines. The one or more client machines are communicatively connected to the optimization system over a network. Then, the optimization system determines a query pattern from the plurality of queries. Based on the query pattern, dimensionality of data is identified for determining data storage strategy. The dimensionality is characterized into 11 dimensions comprising 4 standard level dimensions and 7 higher level dimensions. Based on the determined storage strategy, the optimization system performs at least one of segment at least one of the data and columns of a table stored in the data storage based on the identified dimensionality of data. The optimization system stores the data in remote data storage when the data is an element of a last higher level dimension. The optimization system fragments the higher level dimensions into one or more smaller level dimensions when the data is an element greater than the 11 dimensions.

In another aspect of this technology, a non-transitory computer readable medium for optimizing storage of multi-dimensional data in data storage is disclosed. The non-transitory computer readable medium includes instructions stored thereon that when processed by a processor causes an optimization system to perform acts of analyzing a plurality of queries received over a period of time from one or more client machines. Then, determining a query pattern from the plurality of queries is performed. Based on the query pattern dimensionality of data is identified for determining data storage strategy. The dimensionality is characterized into 11 dimensions comprising 4 standard level dimensions and 7 higher level dimensions. Based on the determined storage strategy, the processor performs at least one, firstly, segmenting at least one of the data and columns of a table stored in the data storage based on the identified dimensionality of data; secondly storing the data in remote data storage when the data is an element of a last higher level dimension; and thirdly fragmenting the higher level dimensions into one or more smaller level dimensions when the data is an element greater than the 11 dimensions.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
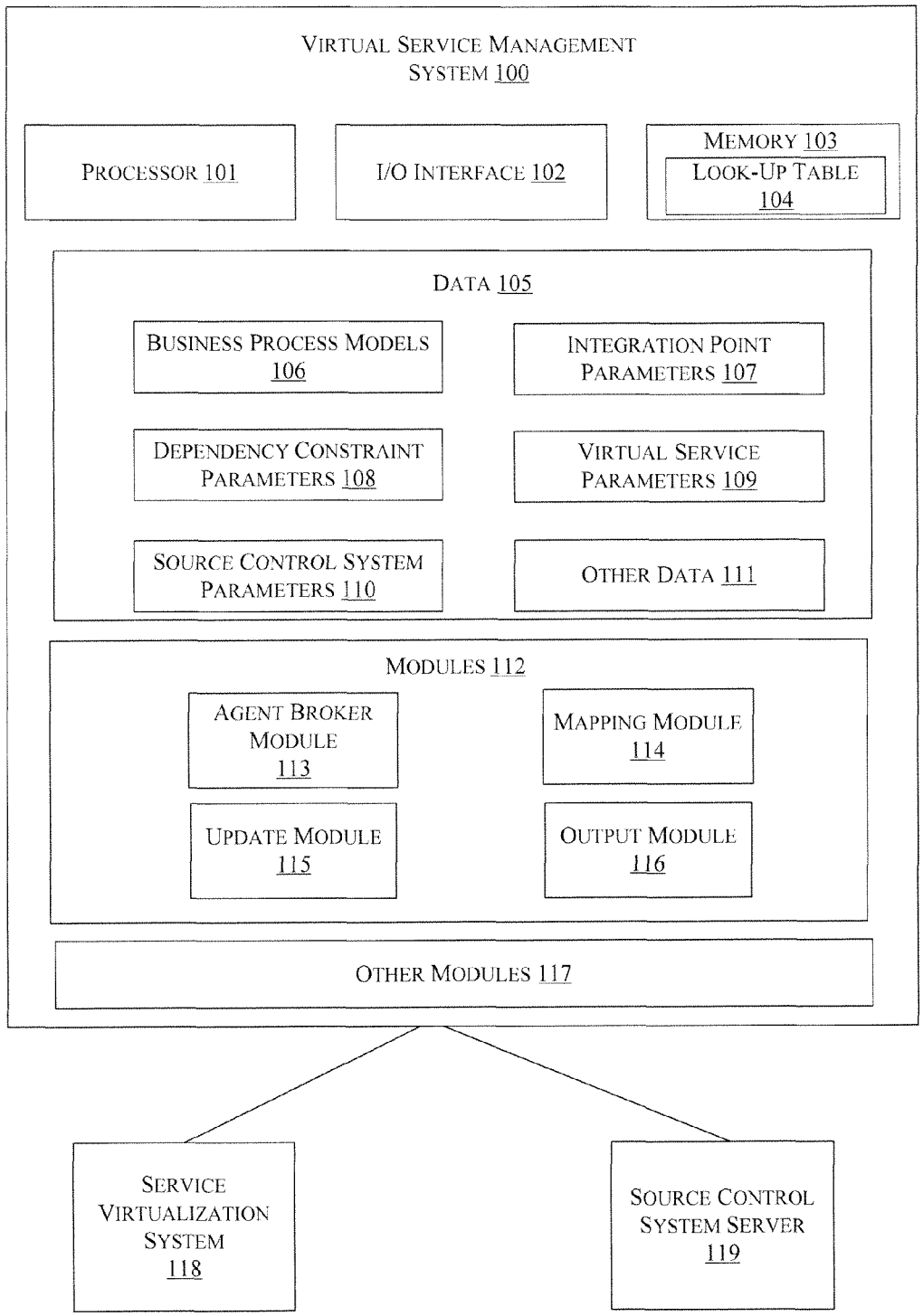
FIG. 1 illustrates a block diagram of optimization system for optimizing storage of multi-dimensional data in data storage in accordance with some embodiments of this technology.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

This technology avoids normalization of entire data storage for the kind of queries requiring/demanding same kind of data. Thus, this technology provides a method which stores only those data separately as required/demanded by the queries. The method is realized by an optimization system. For storing the data, the optimization system analyzes pattern of the queries received from one or more client machines. Based on the pattern of the queries, the dimensionality of data is identified. The dimensionality of data is identified using a membrane theory (M-theory). As per M-theory, the dimensionality of data cannot exceed 11 dimensions. In other words, the dimensionality is limited to 11 dimensions. The 11 dimensions comprise 7 higher level dimensions and 4 standard level dimensions. Out of 7 higher level dimensions, a highest dimension is realized as parallel data storage dimension (i.e. demography). Under $11^{th}$ dimension, all the dimensions are hierarchical in nature with an overlap between lower 6 higher dimensions. The dimensionality of data is identified to evaluate whether the data demanded by the queries is an element of higher level dimension or standard level dimension. Then, based on the dimensionality of data, storage strategy of multi-dimensional data in the data storage is implemented. In an embodiment, the data and/or table which is required by the queries is segmented based on the dimensionality of data. In another embodiment, the data is stored in a separate geography or remote data storage when the data is an element of $11^{th}$ dimension. In another embodiment, the higher level dimensions are fragmented into smaller level dimensions when the data is an element greater than the $11^{th}$ dimension. A reference pointer which is metadata of the tables, data and dimensionality of data is stored in a master table of the optimization system. In this way, quick access to the data tables is accomplished through the metadata stored in the master table of the optimization system. In a regular period of intervals, the data from the data storage is archived by the optimization system based on the usage of data.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates a block diagram of an optimization system 100 for optimizing storage of multi-dimensional data in data storage 113 in accordance with some embodiments of this technology.

The optimization system 100 comprises a central processing unit ("CPU" or "processor") 101, an interface 102, a memory 103, modules 105 and other modules 112. In one implementation, the optimization system 100 may be implemented in a variety of computing systems, such as a laptop computer, a desktop computer, a notebook, a workstation, a mainframe computer, a server, a network server, and the like. In an embodiment, the optimization system 100 is communicatively connected to one or more client machines (not shown in FIG. 1) and the data storage 113 through a network (not shown in FIG. 1). Therefore, the optimization system 100 receives the plurality of queries from the one or more client machines through the network. Then, the optimization system 100 strategizes and optimizes the storage of multi-dimensional data in the data storage 113 through the network.

Examples of the one or more client machines include, but are not limited to, a desktop computer, a portable computer, a mobile phone, a handheld device, a workstation. The one or more client machines may be used by various stakeholders or end users of the organization. In an embodiment, the one or more client machines are used by associated users to raise a plurality of queries and access data from the data storage 113. The at least one user may include a person, a person using the one or more client machines such as those included in this disclosure, or such a client machine itself. In one implementation, the one or more client machines may include an input/output (I/O) interface for communicating with input/output (I/O) devices (not shown in FIG. 1). The one or more client machines are installed with one or more interfaces (not shown in FIG. 1) like software and/or hardware to support one or more communication links (not shown) for interacting with the data storage 113 through the optimization system 100. In an embodiment, the one or more client machines communicate with the network via a network interface (not shown in FIG. 1). The network interface may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc. The distributed network includes, but is not limited to, a direct interconnection, an e-commerce network, a peer to peer (P2P) network, local area network (LAN), wide area network (WAN), wireless network (e.g., using Wireless Application Protocol), the Internet, and Wi-Fi etc.

The network through which the optimization system 100 is communicatively connected to the client machines and the data storage 113 is illustrated herein. The network may be a wireless network, wired network or a combination thereof. The network can be implemented as one of the different types of networks, such as intranet, local area network (LAN), wide area network (WAN), the Internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network may include a variety of network devices, including routers, bridges, servers, computing devices, storage devices, etc.

In another implementation, the optimization system 100 also acts as client machine. Therefore, the plurality of queries is received in the optimization system 100 for analysis and further processing.

The data storage 113 (sometimes called as data warehouse) is a database containing data which is used for reporting and analysis. The purpose of the data storage 113 is to store standardized, structured, consistent, integrated, correct, cleansed and timely data. The data storage 113 stores 'n' number of data integrated from one or more disparate sources or operational system in an organization. The data storage 113 stores current and historical data and are used for creating trending reports. Usually, the data in the data storage 113 is arranged into hierarchical groups often called dimensions and into facts and aggregate facts. The data in the data storage 113 is structured in a way to specifically address the reporting and analytic requirements. In an embodiment, the data storage 113 is a database includes, but is not limited to, a Structured Query Language (SQL) database and a Not Only Structured Query Language (NoSQL) database.

In one implementation, the processor 101 of the optimization system 100 may comprise at least one data processor for executing program components and for executing user- or system-generated queries. The processor 101 may include specialized processing units such as integrated system (bus) controllers, memory management control units, floating point units, graphics processing units, digital signal processing units, etc. The processor 101 may include a microprocessor, such as AMD Athlon, Duron or Opteron, ARM's application, embedded or secure processors, IBM PowerPC, Intel's Core, Itanium, Xeon, Celeron or other line of processors, etc. The processor 101 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc. Among other capabilities, the processor 101 is configured to fetch and execute computer-readable instructions stored in the memory 103.

The interface(s) 102 may include a variety of software and hardware interfaces, for example, a web interface, a graphical user interface, etc. The interface 102 is coupled with the processor 101 and an I/O device (not shown). The I/O device is configured to receive the plurality of queries from the one or more client machines via the interface 102 and transmit outputs or results for displaying in the I/O device via the interface 102.

In one implementation, the memory 103 comprises a master table 104. In an embodiment, the master table 104 stores metadata of data, tables and columns along with dimensionality of data. In an embodiment, the memory 103 may be implemented as a volatile memory device utilized by various elements of the optimization system 100 (e.g., as off-chip memory). For these implementations, the memory 103 may include, but is not limited to, random access memory (RAM), dynamic random access memory (DRAM) or static RAM (SRAM). In some embodiment, the memory 103 may include any of a Universal Serial Bus (USB) memory of various capacities, a Compact Flash (CF) memory, an Secure Digital (SD) memory, a mini SD memory, an Extreme Digital (XD) memory, a memory stick, a memory stick duo, an Smart Media Cards (SMC) memory, an Multimedia card (MMC) memory, and an Reduced-Size Multimedia Card (RS-MMC), for example, noting that alternatives are equally available. Similarly, the memory 103 may be of an internal type included in an inner construction of a corresponding optimization system 100, or an external type disposed remote from such an optimization system 100. Again, the memory 103 may support the above-mentioned memory types as well as any type of memory that is likely to be developed and appear in the near future, such as phase change random access memories (PRAMs), units, buzzers, beepers etc. The one or more units generate a notification for indicating the identified ferroelectric random access memories (FRAMs), and magnetic random access memories (MRAMs), for example.

In one implementation, the modules 105 of the optimization system 100 may be stored within the memory 103. In one example, the modules 105, amongst other things, include routines, programs, objects, components, and data structures, which perform particular tasks or implement particular abstract data types. The modules 105 may also be implemented as, signal processor(s), state machine(s), logic circuitries, and/or any other device or component that manipulate signals based on operational instructions. Further, the modules 105 can be implemented by one or more hardware components, by computer-readable instructions executed by a processing unit, or by a combination thereof.

The modules 105 may include, for example, a query analyzer engine 106, a traffic analyzer 107, a data usage analyzer 108, a next-gen storage engine 109, a data archival engine 110 and alerting unit 111. The optimization system 100 may also comprise other modules 112 to perform various miscellaneous functionalities of the optimization system 100. It will be appreciated that such aforementioned modules may be represented as a single module or a combination of different modules.

Figure 2:
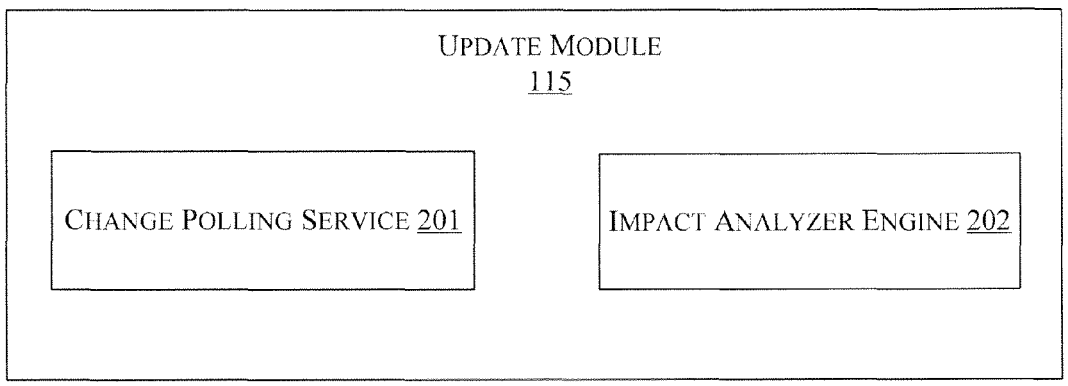
FIG. 2 illustrates a block diagram of a query analyzer engine of the optimization system for analyzing a plurality of queries in accordance with some embodiments of this technology.

The plurality of queries received from the one or more client machines is analyzed by the query analyzer engine 106. The query analyzer 106 comprises two types of analyzers such as SQL query analyzer 201 and a NoSQL query analyzer 206 as shown in FIG. 2.

The SQL query analyzer 201 is designed for analyzing SQL based queries. The SQL based queries are queries constructed to query data in relational databases. The SQL based queries are constructed using constructs include, but are not limited to, ANSI/ISO Standard, Interbase/Firebird, IBM DB2, IBM Informix, IBM Netezza, Microsoft/Sybase, Mimer SQL, Oracle, PostgreSQL, Sybase and Teradata etc. In an embodiment, the SQL query analyzer 201 analyzes the data to be fetched from the SQL database (not shown). The SQL query analyzer 201 comprises a query parser 202, a dimensionality calculator 203, a load and popularity analyzer 204 and a data life span calculator 205. The query parser 202 parses the plurality of queries in terms of table names, columns and condition used in each of the plurality of queries. The dimensionality calculator 203 calculates the dimensionality as per M-theory after the plurality of queries are parsed based on the table, column and condition of the queries. That is, the dimensionality calculator 203 evaluates the level (1-11) of dimension for the data. In an embodiment, dimensionality is categorized up to 11 dimensions as defined in the M-theory. For example, considering a column named "employee name" is specified in the plurality of queries. Based on the frequency of column "employee name" used by the plurality of queries and the complexity of the queries, the column "employee name" is determined to be higher level dimension i.e. $4^{th}$ dimension by the dimensionality calculator 203. The load and popularity analyzer 204 evaluates loading level and popularity of tables and columns specified by the plurality of queries. For example, considering the plurality of queries specifies table named "employee" and columns named "employee name" and "salary" which are used more frequently. Then, the load and popularity analyzer 204 evaluates that the table "employee" is highly loaded and the columns "employee name" and "salary" are most popularly used by the plurality of queries. The data life span calculator 205 evaluates the lifespan of the data in the data storage 113. Typically, the data life span calculator 205 evaluates time after which the data is not fetched.

The NoSQL query analyzer 206 is designed for NoSQL based queries. The NoSQL based queries are the queries which make use of mechanism for storage and retrieval of data modeled in means other than the tabular relations that are used in relational databases. The NoSQL based queries are constructed using constructs include, but are not limited to, BaseX, Cloudant, Clusterpoint, Couchbase Server, Apache CouchDB, djondb, Solr, ElasticSearch, eXist, Jackrabbit, IBM Notes and IBM Domino, MarkLogic Server, MongoDB, ObjectDatabase++, Oracle NoSQL Database, OrientDB, CoreFoundation Property list, Sedna, SimpleDB, TokuMX and OpenLink Virtuoso etc. In an embodiment, the NoSQL query analyzer 306 analyzes on the data to be fetched from the NoSQL database (not shown). In an embodiment, the NoSQL query analyzer 306 comprises a correlation engine 207, a load and popularity analyzer 208 and a data life span calculator 209. The correlation engine 207 determines correlation between different fields of the tables in the data storage 113. Particularly, the correlation engine 207 determines correlation between different fields and the degree of popularity of certain fields stored in the NoSQL database. In an embodiment, the load and popularity analyzer 208 finds popularity of fields which is used to determine the dimensionality of fields and policy of storage of data. Also, the load and popularity analyzer 208 evaluates the increase in load due to storage of unwanted fields which optimizes the storage of only those data in the data storage 113 as required by the queries. In an embodiment, the data life span calculator 209 evaluates the lifespan of the data in the data storage 113 i.e. NoSQL database.

Referring back to FIG. 1, the query analyzer engine 106 analyzes the plurality of queries which are received over a period of time from the one or more client machines. For example, query 1, query 2, query 3 and query 4 may be received over a time of one hour one after the other from the client machine. The query 1, query 2, query 3 and query 4 are analyzed.

The query analyzer engine 106 determines a query pattern from the plurality of queries based on parameters and factors. Particularly, the query analyzer engine 106 determines the query pattern from the plurality of queries based on the parameters include, but are not limited to, type of queries, location from where the queries are initiated, time at which queries are received, frequency of the queries, correlation between the columns of the queries, correlation between the constraints of the queries, volume of data retrieved on each of the queries, frequency of data usage, complexity of the join queries, keys used in the queries and dataset retrieved from demography of the queries. Additionally, the query analyzer engine 106 determines redundant indexes in the data storage 113 based on historical query analysis. In an embodiment, the query analyzer engine 106 provides the analysis information to the traffic analyzer 107, the data usage analyzer 108, the next-gen storage engine 109, the data archival engine 110 and the alerting unit 111.

The traffic analyzer 107 receives the analysis information from the query analyzer engine 106. Then, the traffic analyzer 107 analyzes the tables and columns of the data storage 113 which are under usage for the plurality of queries. Also, the traffic analyzer 107 analyzes number of times, columns and tables are used. Further, the traffic analyzer 107 analyzes the time at which the plurality of queries is received and location from where the plurality of queries is received.

The data usage analyzer 108 performs analysis on volume of data used by different types of query, data used by the queries based on the time and location from where the queries are received. Further, the data usage analyzer 108 performs analysis on the frequency of usage of the records by the queries and data which are unused. In an embodiment, the data usage analyzer 108 generates a report of data usage over a period of time.

Figure 3:
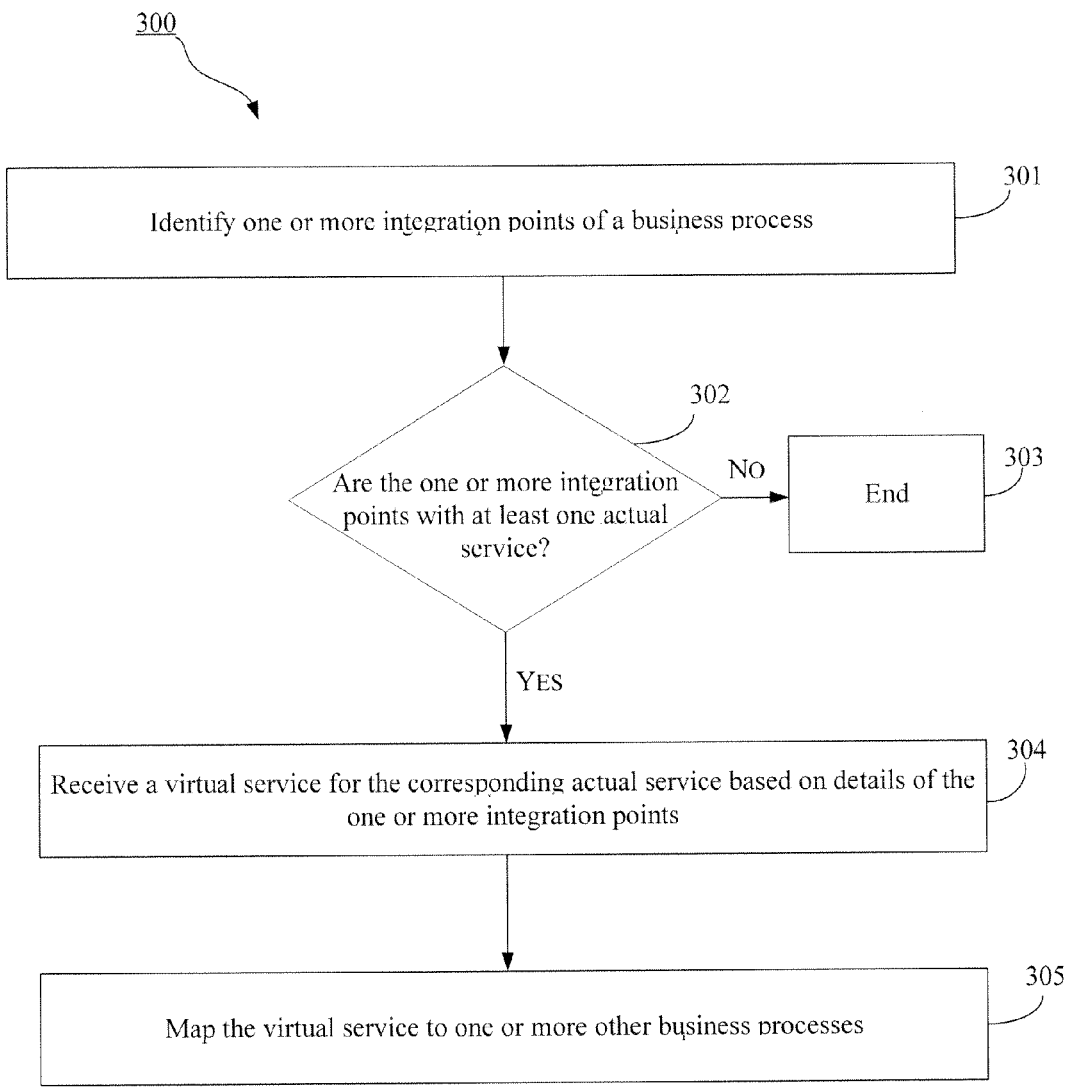
FIG. 3 illustrates a block diagram of a next-gen storage engine of the optimization system for identifying dimensionality of data in accordance with some embodiments of this technology.

The next-gen storage engine 109 identifies dimensionality of data based on the query pattern determined by the query analyzer engine 106. The next-gen storage engine 109 identifies the dimensionality of data for determining data storage strategy in the data storage 113. The next-gen storage engine 109 comprises a dimensionality detection engine 301 for identifying the dimensionality of data as shown in FIG. 3. The dimensionality detection engine 301 uses the analysis information from the traffic analyzer 107 and the data usage analyzer 108 to identify the dimensionality of data. In an embodiment, the dimensionality of data is identified based on types of the plurality queries, complexity of the plurality of queries and data used by the plurality of queries. In an embodiment, the dimensionality is characterized into 11 dimensions as per M-theory. The 11 dimensions comprise 4 standard level dimensions and 7 higher level dimensions. In an embodiment, the highest dimension i.e. $11^{th}$ dimension which is the highest dimension out of 7 higher level dimensions is demography. Particularly, the $11^{th}$ dimension is considered to be the parallel data storage dimension or parallel universe. A non-limiting example is illustrated herein. A scenario of ad-media-metric Company where the data related to the advertisement company is fetched. For example, considering the queries, query 1, query 2, query 3 and query 4 are received and analyzed. Then, a query pattern from the query 1, the query 2, the query 3 and the query 4 is determined where all the queries are fetching similar kind of data from the data storage 113. For example, all the four queries (i.e. query 1, the query 2, the query 3 and the query 4) are fetching data on the ad-media-metric Company. Particularly, all the queries (i.e. query 1, the query 2, the query 3 and the query 4) are fetching at least one entities such as product, category, product category, types of data stream, category of the advertisement (ad), region of click stream, custom section, data processing section, IP resolution and time mapping, sales information based on demography and campaign information. Now, dimensionality of data required by the queries within 11 dimensions is determined from the query pattern. These entities are assigned with dimensions based on the query pattern i.e. frequency with which the entities are used by all queries (i.e. query 1, the query 2, the query 3 and the query 4), complexity of the query where the entity is used etc. Each table represents one dimension. For example, each of the tables "product", "category", "product_category" and so on which are fields of the ad-media-metrics company is stored as one dimension. That is, the table "product" is stored as one dimension, the table "category" is stored as another dimension, the table "product_category" is stored as another dimension and so on.

In one implementation, the dimensionality detection engine 401 evaluates lower and higher dimensions of the columns. For example, considering a scenario of typical ad-media-metrics company, where the queries are defined to fetch the data on products, sales and category of the advertisement. Here, the 'products', 'sales' and 'category' are used by the queries more frequently. Thus, the entities products, sales and category are termed as higher dimensions. Another example, assuming the sub field of 'product' includes 'name of the product' and 'region of sales'. Based on the query pattern, the sub field 'region of sales' is used more frequently by the queries. Thus, the sub field 'region of sales' becomes higher dimension and is stored as a separate dimension in the data storage 113. In another implementation, for example, assuming the sub field of 'product' is 'count of sales' which is used in a moderate frequency. Next, a correlation between 'product' and 'count of sales' is determined The correlation is determined based on the fields, columns and tables specified by the queries. In the above illustrated example, the queries specify 'product' and 'count of sales'. Upon determining the correlation, the sub field 'count of sales' is determined as lower dimension which is stored under the higher dimension 'product'.

The storage type prediction 302 of the dimensionality detection engine 301 is configured to determine the type of storage based on the complexity of the plurality of queries and the data usage.

The next-gen storage engine 109 further comprises a data orchestration engine 303 which strategizes the storage of the data in the data storage 113. Based on the dimensionality of data and storage type prediction, the data orchestration engine 303 performs segmentation of at least one of the data and the columns of a table stored in the data storage 113. For example, consider a scenario of ad-media-metric-company for segmenting the columns of table. Now considering four queries namely query 1, query 2, query 3 and query 4 received from the one or more client machines over a period of time. The query pattern from the queries (i.e. query 1, query 2, query 3 and query 4) is determined which requires results on column "category" of the "product" table and column "social media" of the "types of data stream" table. That is, the column "category" and "social media" are used more frequently based on the query pattern. Then, the column "category" of the entity "product" is segmented and stored either in same table or as a separate table in the data storage 113 based on the degree of correlation and association. Similarly, the column "social media" of the table "types of data stream" is segmented and stored as a separate table in the data storage 113. In an embodiment, for example, "product" dimension is used more frequently and is stored as separate dimension in the data storage 113. If the columns "category" and "social media" are used in less frequent manner and are correlated to the "product" dimension. Then the columns "category" and "social media" are stored under "product" dimension.

The data orchestration engine 303 performs storing of the data in remote data storage when the data is an element of a last higher level dimension, i.e. $11^{th}$ dimension. In an embodiment, the $11^{th}$ dimension is considered to be demography. The table structure in different demography is same but the data entries in the table differ among different demography. In an embodiment, the $11^{th}$ dimension may be stored in same location of the data storage 113. In another embodiment, the $11^{th}$ dimension may be stored in a different remote location of different data storage. Usually, the lower dimensions are stored in same storage location of the data storage 113. In an embodiment, the data is stored in a separate remote location of the data storage 113 when the data is an element of the $11^{th}$ dimension. In an embodiment, the data may be stored separately in same location of the data storage 113 when the data is an element of the $11^{th}$ dimension. For example, the query pattern from the queries (i.e. query 1, query 2, query 3 and query 4) is determined which requires results on "rate of sale" in "Europe". In such case, the user specifies the queries with the field namely "Europe" under which the column "rate of sale" is specified. As per the queries pattern, the field "Europe" is higher dimension and assuming the field "Europe" is stored as an element of $11^{th}$ dimension. The column "rate of sale" is lower dimension under the higher dimension "Europe". Considering, the results on the field "Europe" and the "rate of sale" in "Europe" is stored in a data storage prescribed for storing information relating to country "Europe". Now, after a period of time, assuming the queries are fetching results on "rate of sale" in "France" country. The information on field "France" being one of the countries in "Europe" has information stored in the same data storage prescribed for the country "Europe". As per the query pattern, the field "France" becomes the higher dimension and is determined to be an element of $11^{th}$ dimension. The column the rate of sale" must be under higher "France". Therefore, the field "France" is stored as a $11^{th}$ dimension in the data storage 113.

Considering, the queries are fetching results on "rate of sale" for "US" and "France". The information relating to "US" is stored in geography of 'US' data storage. The information relating to "France" is stored in geography of 'France' data storage. When the queries specify the fields to retrieve information of both "US" and "France", then the demography of both the fields "US" and "France" are linked. Then, the information of "rate of sale" in both "US" and "France" are aggregated and are stored in the data storage 113.

In one implementation, the data orchestration engine 303 fragments the higher level dimensions into one or more smaller level dimensions when the data is an element greater than the 11 dimensions. Consider the dimension 'region of the sale' of the 'product' entity which is already stored as a separate dimension i.e. $11^{th}$ dimension in the data storage 113. Based on the query pattern, the "region of sale" which could be Europe is stored as $11^{th}$ dimension. Based on the complexity of query, the entity 'France' is also stored at $11^{th}$ dimension. In such a case, the entity 'Europe' becomes $12^{th}$ dimension due to relationship and dimensionality mapping. But, the dimensionality of data limits the highest dimension to be $11^{th}$ dimension. Hence, the dimension 'Europe' is broken into lower dimension where entity 'France' becomes the highest dimension and a smaller degree dimension table is created to store the mapping of 'France' with 'Europe'.

In an embodiment, the data orchestration engine 303 combines the columns of one or more tables into a table upon determining correlation between columns of the one or more tables of the data storage based on the query pattern. For example, the query pattern from the queries (i.e. query 1, query 2, query 3 and query 4) is determined which requires results on column "brand" of the "product" entity and "category type" of the "category" entity. Assuming, the columns "brand" and "category type" are correlated as per the query pattern. Then, the data column "brand" of the entity "product" and "category type" of the "category" entity is stored in a separate table in the data storage 113.

Referring to FIG. 1, the master table 104 of the memory 103 stores metadata of the data, the tables, and the dimensionality of the data. In an embodiment, the metadata may be a pointer reference to the storage location of the data, the tables and dimensionality of the data. Particularly, the master table 104 stores the metadata after the data and/or tables are segmented, stored in the remote data storage, fragmented into smaller dimension, and dimensionality is identified.

In an embodiment, the data archival engine 110 of the optimization system 100 archives the data, the tables and columns from the data storage 113. The archiving of the data, the tables, and the columns is carried out based on the lifespan of the data determined by the data lifespan calculator 205 from the query pattern. In an embodiment, the data, the tables and columns are archived when the data, the tables and columns are not accessed for a period of time.

In an embodiment, the optimization system 100 is replicated in at least one secondary optimization system (not shown). The data from the at least one secondary optimization system is retrieved for the plurality of queries when the optimization system 100 breaks down or not functional. In an embodiment, the optimization system 100 communicates signals to the at least one secondary optimization system indicating functional status of the optimization system 100.

The at least one secondary optimization system optimizes the storage of multi-dimensional data in the data storage 113 when the optimization system 100 is not functioning.

In an embodiment, the optimization system 100 includes a suggestion engine (not shown in FIG. 1). The suggestion engine provides the time duration at which the data needs to be archived from the data storage 113. The suggestion engine determines on splitting of the data archive process based on the query pattern i.e. archiving the data one by one in different time slots. Also, the suggestion engine determines on parallelizing the data archive process i.e. two or more data are archived together in the same time slot based on the query pattern. The suggestion engine recommends scaling of data storage clusters based on historical data analysis and data growing pattern. In an embodiment, the recommendation on archiving process for archiving data, tables, columns, indexes are configurable by the user, for example, system administrator. The suggestion engine comprises an optimizer and a feedback learning engine. The optimizer of the suggestion engine optimizes on the storage and archiving the columns in the table and data which are no more useful by the queries to reduce the turnaround of the queries. Further, the optimizer optimizes the storage environment by recommending archiving of indexes and adding of new indexes from and to the data storage 113 respectively. The optimizer optimizes the storage of data by changing the way of storage of data. The feedback learning engine uses the recommendation on archiving process from the system administrator as feedback information. Then, the feedback learning engine provides the feedback information to other components of the optimization system 100.

In an embodiment, the alerting units 111 of the optimization system 100 provide alerts to the one or more client machines. The alerts are provided based on at least one of failure of the optimization system 100 and/or the at least one secondary optimization system. In another implementation, the alerts are provided based on factors include, but are not limited to, syntax error in defining the queries, unavailability of space for storing the data, unavailable of data for the query and increase of query volume more than a predefined volume. In an embodiment, the factors for providing alert are configurable by the user, for example, database administrator.

Figure 4:
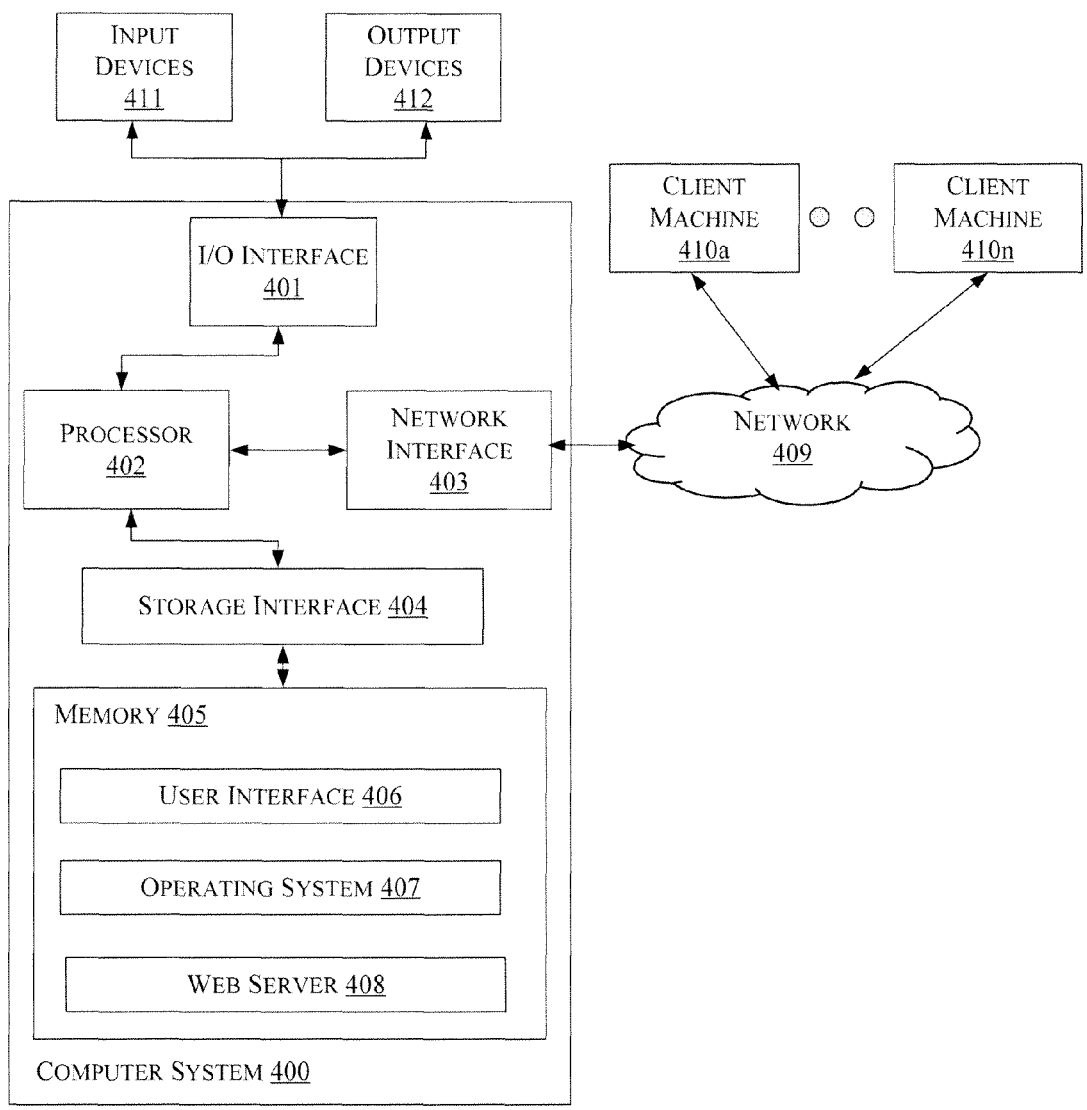
FIG. 4 illustrates a flowchart showing method for optimizing storage of multi-dimensional data in the data storage in accordance with some embodiments of this technology.

FIG. 4 illustrates a flowchart of method 400 for optimizing storage of multi-dimensional data in the data storage 113 in accordance with an embodiment of this technology.

As illustrated in FIG. 4, the method 400 comprises one or more blocks for optimizing the storage of multi-dimensional data in the data storage 113 performed by the optimization system 100. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method 900. Additionally, individual blocks may be deleted from the method 400 without departing from the spirit and scope of the subject matter described herein. Furthermore, the method 400 can be implemented in any suitable hardware, software, firmware, or combination thereof.

At block 401, a plurality of queries received over a period of time from the one or more client machines are analysed. In an embodiment, the query analyser engine 106 analyses the plurality of queries which are received over a period of time from the one or more client machines. In an embodiment, the plurality of queries is a Structured Query Language (SQL) based queries and/or Not Only Structured Query Language (NoSQL) based queries.

At block 402, a query pattern is determined from the plurality of queries. In an embodiment, the query analyser engine 106 determines the query pattern from the plurality of queries analysed at block 401. In an embodiment, the query pattern from the plurality of queries is determined by parameters include, but are not limited to, type of queries, location from where the queries are initiated, time at which queries are received, frequency of the queries, correlation between the columns of the queries, correlation between the constraints of the queries, volume of data retrieved on each of the queries, frequency of data usage, complexity of the join queries, keys used in the queries and dataset retrieved from demography of the queries.

At block 403, dimensionality of data is identified based on the query pattern for determining data storage strategy. In an embodiment, the next-gen storage engine 109 identifies the dimensionality of data based on the query pattern determined at block 402 for determining data storage strategy. In an embodiment, the dimensionality is characterized into 11 dimensions comprising 4 standard level dimensions and 7 higher level dimensions.

At block 404, at least one of the data and the columns of a table stored in the data storage 113 are segmented based on the dimensionality of data. In an embodiment, the data and/or columns of the table are segmented based on the dimensionality of data identified at block 403.

At block 405, a condition is checked whether the data is an element of a last higher level dimension. If the data is an element of the last higher level dimension i.e. $11^{th}$ dimension, then, the process proceeds to block 406 via "YES" where the data is stored in remote data storage. If the data is not an element of the last higher level dimension, then the process proceeds to block 407 via "NO" where the process ends.

At block 408, a condition is checked whether the data is an element greater than the last higher level dimension. If the data is an element greater than the $11^{th}$ dimension, then the process proceeds to block 409 via "YES" where the higher level dimensions are fragmented into one or more smaller level dimensions. If the data is not an element of the last higher level dimension, then the process proceeds to block 410 via "NO" where the process ends.

In an embodiment, the process performs combining the columns of one or more tables into a table upon determining correlation between columns of the one or more tables of the data storage based on the query pattern.

In an embodiment, metadata of the data, the table, and the dimensionality of the data are stored in the master table 104 of the memory 103.

In an embodiment, the process includes replicating the optimization system 100 in at least one secondary optimization system.

In an embodiment, the process includes providing alerts through the alerting units 111 based on at least one of failure of the optimization system 100 and the at least one secondary optimization system, syntax error in defining the queries, unavailability of space for storing the data, unavailable of data for the query and increase of query volume more than a predefined volume.

In an embodiment, the process includes archiving the data by the data archival engine 110 based on a lifespan of the data determined by the data life span calculator 205 based on the query pattern.

Advantages of this technology are illustrated herein.

Embodiments of this technology eliminate the process of normalization for the same kind of queries.

Embodiments of this technology cache the required tables, columns, and data in a master table for faster access based on kinds of queries.

Embodiments of this technology manage any number of dimensions of data. Particularly, multi-dimensional data are managed in the data storage 104 by this technology.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Optimization System |
| 101 | Processor |
| 102 | Interfaces |
| 103 | Memory |
| 104 | Master Table |
| 105 | Modules |
| 106 | Query Analyzer Engine |
| 107 | Traffic Analyzer |
| 108 | Data Usage Analyzer |
| 109 | Next-Gen Storage Analyzer |
| 110 | Data Archival Engine |
| 111 | Alerting Units |
| 112 | Other Modules |
| 113 | Data Storage |
| 201 | SQL Query Analyzer |
| 202 | Query Parser |
| 203 | Dimensionality Calculator |
| 204, 208 | Load and Popularity Analyzer |
| 205, 209 | Data Life Span Calculator |
| 206 | NoSQL Query Analyzer |
| 207 | Correlation Engine |
| 301 | Dimensionality Detection Engine |
| 302 | Storage Type Predictor |
| 303 | Data Orchestration Engine |

What is claimed is:

1. A method for optimizing storage of multidimensional data, the method comprising:

analyzing, by an optimization system, a plurality of queries received over a period of time from one or more client machines;

determining, by the optimization system, a query pattern from the plurality of queries;

identifying, by the optimization system, dimensionality of data based on the query pattern and determining a data storage strategy based at least in part on the dimensionality, wherein the dimensionality is characterized into 11 dimensions comprising 4 standard level dimensions and 7 higher level dimensions; and performing, based on the determined data storage strategy and by the optimization system, at least one of:

segmenting at least one of the data or columns of a table stored in a data storage based on the identified dimensionality;

storing the data in a remote data storage when the data is an element of a last one of the higher level dimensions; or fragmenting the higher level dimensions into one or more lower level dimensions when the data is an element greater than the 11 dimensions.

2. The method as claimed in claim 1, wherein one or more of the plurality of queries is a Structured Query Language (SQL) based query or a Not Only Structured Query Language (NoSQL) based query.

3. The method as claimed in claim 1, wherein the query pattern is further determined based on parameters comprising type of the queries, location from where the queries are initiated, time at which the queries are received, frequency of the queries, correlation between columns of the queries, correlation between constraints of the queries, volume of data retrieved on each of the queries, frequency of data usage, complexity of join queries, keys used in the queries, or dataset retrieved from a demography of the queries.

4. The method as claimed in claim 1 further comprising storing, by the optimization system, metadata of the data, the table, and the dimensionality of the data in a master table.

5. The method as claimed in claim 1 further comprising providing, by the optimization system, one or more alerts based on at least one of a failure of the optimization system and the at least one secondary optimization system, a syntax error in defining one or more of the queries, an unavailability of space for storing the data, an unavailability of data for one or more of the queries, or an increase of query volume more than a predefined volume.

6. The method as claimed in claim 1 further comprising archiving, by the optimization system, the data based on a lifespan of the data, wherein the lifespan of the data is determined from the query pattern.

7. An optimization system, comprising:
a processor; and
a memory communicatively coupled to the processor, wherein the memory stores processor-executable instructions which, on execution by the processor, cause the processor to:
analyzing a plurality of queries received over a period of time from one or more client machines;
determining a query pattern from the plurality of queries;
identifying dimensionality of data based on the query pattern and determining a data storage strategy based at least in part on the dimensionality, wherein the dimensionality is characterized into 11 dimensions comprising 4 standard level dimensions and 7 higher level dimensions; and
performing, based on the determined data storage strategy, at least one of:
segmenting at least one of the data or columns of a table stored in a data storage based on the identified dimensionality;
storing the data in a remote data storage when the data is an element of a last one of the higher level dimensions; or
fragmenting the higher level dimensions into one or more lower level dimensions when the data is an element greater than the 11 dimensions.

8. The optimization system as claimed in claim 7, wherein one or more of the plurality of queries is a Structured Query Language (SQL) based query or a Not Only Structured Query Language (NoSQL) based query.

9. The optimization system as claimed in claim 7, wherein the query pattern is further determined based on parameters comprising type of the queries, location from where the queries are initiated, time at which the queries are received, frequency of the queries, correlation between columns of the queries, correlation between constraints of the queries, volume of data retrieved on each of the queries, frequency of data usage, complexity of join queries, keys used in the queries, or dataset retrieved from a demography of the queries.

10. The optimization system as claimed in claim 7, wherein the memory further stores processor-executable instructions which, on execution by the processor, cause the processor to store metadata of the data, the table, and the dimensionality of the data in a master table.

11. The optimization system as claimed in claim 7, wherein the memory further stores processor-executable instructions which, on execution by the processor, cause the processor to provide one or more alerts based on at least one of a failure of the optimization system and the at least one secondary optimization system, a syntax error in defining one or more of the queries, an unavailability of space for storing the data, an unavailability of data for one or more of the queries, or an increase of query volume more than a predefined volume.

12. The optimization system as claimed in claim 7, wherein the memory further stores processor-executable instructions which, on execution by the processor, cause the processor to archive the data based on a lifespan of the data, wherein the lifespan of the data is determined from the query pattern.

13. A non-transitory computer readable medium having stored thereon instructions for optimizing storage of multi-dimensional data comprising executable code which when executed by a processor, cause the processor to perform steps comprising:
analyzing a plurality of queries received over a period of time from one or more client machines;
determining a query pattern from the plurality of queries;
identifying dimensionality of data based on the query pattern and determining a data storage strategy based at least in part on the dimensionality, wherein the dimensionality is characterized into 11 dimensions comprising 4 standard level dimensions and 7 higher level dimensions; and
performing, based on the determined data storage strategy, at least one of:
segmenting at least one of the data or columns of a table stored in a data storage based on the identified dimensionality;
storing the data in a remote data storage when the data is an element of a last one of the higher level dimensions; or
fragmenting the higher level dimensions into one or more lower level dimensions when the data is an element greater than the 11 dimensions.

14. The medium as claimed in claim 13, wherein one or more of the plurality of queries is a Structured Query Language (SQL) based query or a Not Only Structured Query Language (NoSQL) based query.

15. The medium as claimed in claim 13, wherein the query pattern is further determined based on parameters comprising type of the queries, location from where the queries are initiated, time at which the queries are received, frequency of the queries, correlation between columns of the queries, correlation between constraints of the queries, volume of data retrieved on each of the queries, frequency of data usage, complexity of join queries, keys used in the queries, or dataset retrieved from a demography of the queries.

16. The medium as claimed in claim 13, further having stored thereon instructions further comprising executable code which when executed by the processor, cause the processor to perform steps further comprising storing metadata of the data, the table, and the dimensionality of the data in a master table.

17. The medium as claimed in claim 13, further having stored thereon instructions further comprising executable code which when executed by the processor, cause the processor to perform steps further comprising providing one or more alerts based on at least one of a failure of the optimization system and the at least one secondary optimization system, a syntax error in defining one or more of the queries, an unavailability of space for storing the data, an unavailability of data for one or more of the queries, or an increase of query volume more than a predefined volume.

18. The medium as claimed in claim 13, further having stored thereon instructions further comprising executable code which when executed by the processor, cause the processor to perform steps further comprising archiving the data based on a lifespan of the data, wherein the lifespan of the data is determined from the query pattern.

* * * * *